United States Patent [19]

Inoue

[11] Patent Number: 5,729,793
[45] Date of Patent: Mar. 17, 1998

[54] DUST ADHESION PREVENTION SYSTEM FOR IMAGE SCANNING SYSTEM

[75] Inventor: Toshiyuki Inoue, Kanagawa-ken, Japan

[73] Assignee: Fuji Photo Film Co. Ltd., Kanagawa-ken, Japan

[21] Appl. No.: 674,733

[22] Filed: Jul. 2, 1996

[30] Foreign Application Priority Data

Jul. 10, 1995 [JP] Japan .................................. 7-173592

[51] Int. Cl.⁶ .................................................. G03G 21/00
[52] U.S. Cl. .................... 399/92; 399/98; 355/30; 347/138
[58] Field of Search ........................ 399/92, 93, 98, 399/99; 355/30; 347/134, 138, 257

[56] References Cited

U.S. PATENT DOCUMENTS

| | | |
|---|---|---|
| 4,387,982 | 6/1983 | Stanley . |
| 4,469,430 | 9/1984 | Terashima . |
| 4,530,589 | 7/1985 | Adams . |
| 4,723,150 | 2/1988 | Lutus . |
| 5,059,991 | 10/1991 | Morisawa ................. 346/160 |
| 5,192,973 | 3/1993 | Hickisch . |
| 5,398,099 | 3/1995 | Nagamochi et al. . |
| 5,613,174 | 3/1997 | Denton et al. ................. 399/98 |

FOREIGN PATENT DOCUMENTS

| | | |
|---|---|---|
| 0529404 | 3/1993 | European Pat. Off. . |
| 5193609 | 3/1993 | Japan . |

OTHER PUBLICATIONS

Patent Abstracts of Japan, vol. 18, No. 594 (M1703), Nov. 14, 1994 for JP-A-06221640, Aug. 12, 1994.
Patent Abstracts of Japan, vol. 16, No. 554 (E1293), Nov. 25, 1992 for JP-A-04212229, Aug. 3, 1992.
English Abstract of British Patent 2,123,550, Feb. 1, 1984.
Patent Abstracts of Japan, (CD-ROM), Unexamined Applications, vol. 94, No. 11 for JP-A-06317951, Nov. 15, 1994.
Patent Abstracts of Japan, Unexamined Applications, Sec. P, Sect. No. 1256, vol. 15, No. 415, p. 23, Oct. 22, 1991 for JP-A-03167493, Jul. 19, 1991.
Patent Abstracts of Japan, Unexamined Applications, Sec. P, Sect No. 879, vol. 13, No. 239, p. 111, Jun. 6, 1989 for JP-A-01043708, Feb. 16, 1989.

*Primary Examiner*—R. L. Moses

[57] ABSTRACT

In an image scanning system, a deflector is contained in a casing having a cover glass which transmits a scanning light beam deflected by the deflector. An air flow is formed in front of the cover glass to prevent dust adhesion.

8 Claims, 4 Drawing Sheets

DUST ADHESION PREVENTION SYSTEM FOR IMAGE SCANNING SYSTEM

BACKGROUND OF THE INVENTION

1. Field of the Invention

This invention relates to a dust adhesion prevention system for an image scanning system, and more particularly to a system for preventing dust from adhering to a cover glass of a casing in which a deflector for deflecting a scanning light beam is contained.

2. Description of the Related Art

In an image scanning system using a raster scan of a laser beam, the deflector for deflecting a scanning light beam is generally contained in a casing having a cover glass which transmits the scanning light beam in order to prevent dust from the entering the optical system including the deflector. This prevents dust or the like from adhering to the reflecting surface of the deflector such as a rotary polygonal mirror or reflecting surfaces in the optical system downstream of the deflector. When dust adheres to the reflecting surfaces in the optical system downstream of the deflector, streaks appear in a recorded image described later.

Further the cover glass serves to prevent the reflecting surfaces of the polygonal mirror from staining and to prevent air turbulence caused by the polygonal mirror rotating at high speed from affecting the overall optical system. Stain on the reflecting surface of the polygonal mirror lowers the reflectivity of the polygonal mirror and causes shading or the like. In the case of a color printer, stain on the reflecting surface of the polygonal mirror can cause non-uniformity in color. Accordingly it is preferable to provide such a scanning system with a cover glass.

However when such a cover glass accumulates dust, the scanning light beam is affected by the dust and the scanning performance deteriorates. That is, when the scanning light beam deflected by the deflector for raster scan passes through the cover glass, the intensity of the scanning light beam is reduced at the portion of the cover glass with the dust thereon and the density of the recorded image is reduced at the same place on the main scanning line, which results in streaking extending in the sub-scanning direction. A similar phenomenon occurs in an image reading system, and this is fatal for an image scanning system.

Accordingly when such streaking appears in an image, the system must be stopped for cleaning of the cover glass. However there are objects which cannot be scanned again, e.g., a stimulable phosphor sheet for use in radiography, and accordingly deterioration in performance of such an image scanning should be avoided to the utmost.

Especially in the case of a system where recording is effected continuously at high speed, there is produced a great loss before the operator recognizes the defect due to dust on the cover glass and stops the system.

SUMMARY OF THE INVENTION

In view of the foregoing observations and description, the primary object of the present invention is to provide a system for preventing dust from adhering to a cover glass of a casing of an image scanning system.

Another object of the present invention is to provide a system for removing dust adhering to the cover glass as well as preventing dust from adhering to the cover glass.

The dust adhesion prevention system for an image scanning system in accordance with the present invention includes a means for forming an air flow in front of the cover glass, thereby preventing dust from adhering to the surface of the cover glass.

The air flow may be an air flow blown on the surface of the cover glass and/or an air curtain formed in front of the cover glass. Further the air flow may be a flow of air which is generated when an enclosed space is formed in the vicinity of the surface of the cover glass with an air outlet provided in a position remote from the surface of the cover glass and the space is pressurized so that air is discharged through the air outlet.

It is preferred that the air flow comprises air supplied from inside the image scanning system.

In one embodiment of the present invention, the cover glass is conductive and grounded so that charged dust cannot adhere to the cover glass. Further the cover glass may be charged to have the same polarity as charged dust so that charged dust cannot adhere to the cover glass.

In the system of the present invention, the air flow formed in front of the cover glass prevents dust from adhering to the surface of the cover glass.

When the air is blown on the surface of the cover glass, the air flow removes dust adhering to the surface of the cover glass as well as prevents dust from adhering to the surface. When an air curtain formed in front of the cover glass is used together with the air flow blown on the surface of the cover glass, the effect is increased.

When the air flow includes air supplied from inside the image scanning system, the air flow does not produce a temperature difference between the air flow and the inside of the image scanning system or the casing, and accordingly flicker cannot be produced in the optical system.

When the cover glass is conductive and grounded, charged dust cannot adhere to the cover glass, whereby dust adhesion prevention effect is further enhanced. When the cover glass is charged to have the same polarity as the charged dust, the charged dust cannot adhere to the cover glass.

DESCRIPTION OF THE PREFERRED EMBODIMENT

Figure 1:
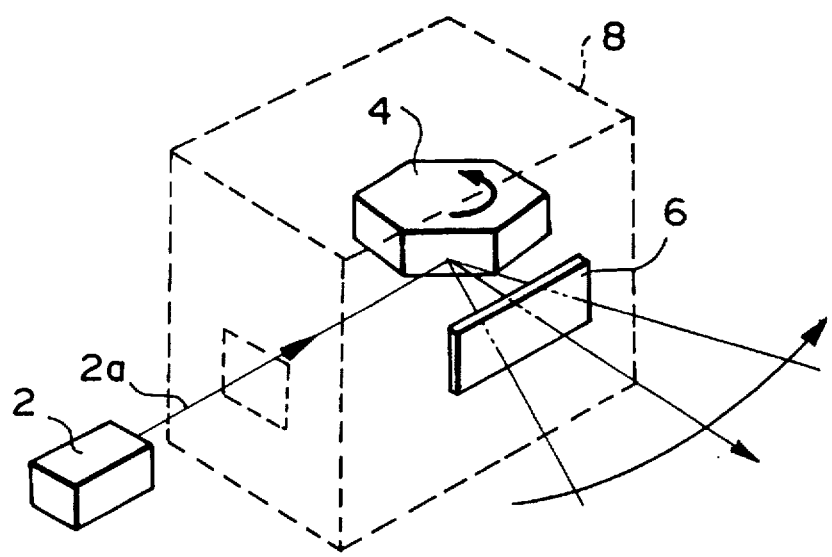
FIG. 1 is a perspective view showing a part of an image scanning system in which a dust adhesion prevention system of the present invention is employed.

In FIG. 1, an image scanning system includes a rotary polygonal mirror 4 which deflects a laser beam 2a emitted from a laser 2. The polygonal mirror 4 is contained in a casing 8 in order to prevent entrance of dust into the optical system of the light scanning system including the polygonal mirror 4. The casing 8 is provided with a cover glass 6 through which the laser beam 2a travels. The laser 2 may also be contained in the casing 8.

Figure 2:
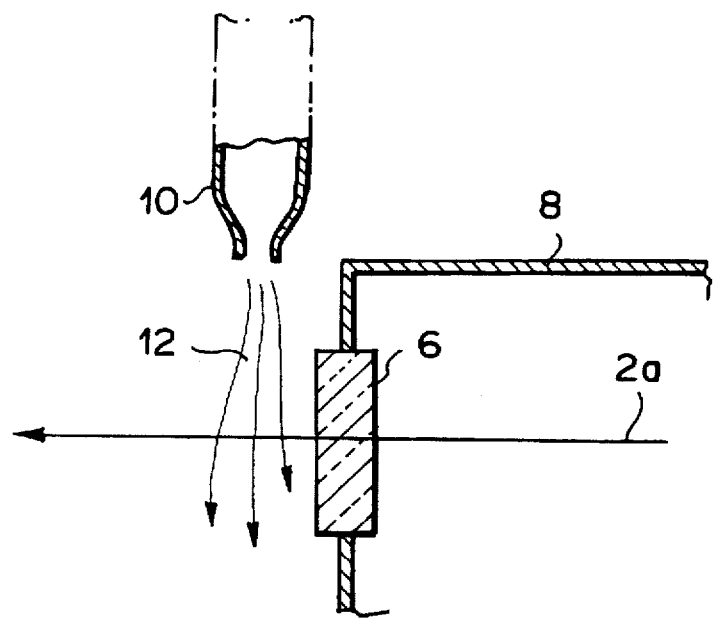
FIG. 2 is a cross-sectional view of a dust adhesion prevention system in accordance with an embodiment of the present invention.

In a dust adhesion prevention system in accordance with an embodiment of the present invention shown FIG. 2, a wide nozzle 10 which blows air downward is provided above in front of the cover glass 6. The nozzle 10 produces a constant downward air flow 12 like an air curtain in front of the cover glass 6, whereby dust is prevented from adhering to the surface of the cover glass 6.

A part or all of the air flow 12 may be blown on the surface of the cover glass 6 as an air shower.

Figure 3:
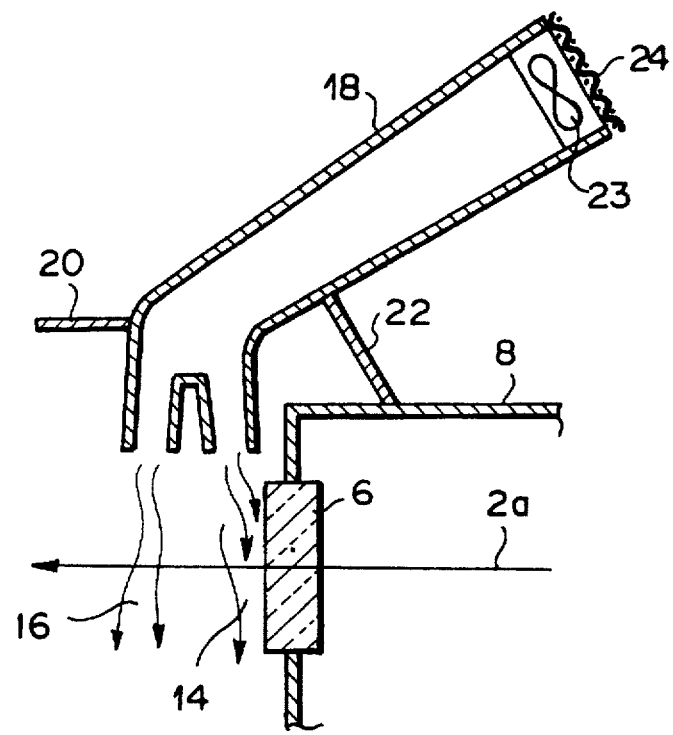
FIG. 3 is a cross-sectional view of a dust adhesion prevention system in accordance with another embodiment of the present invention.

In a dust adhesion prevention system in accordance with another embodiment of the present invention shown in FIG. 3, an air duct 18 having bifurcated air outlet is employed. Air discharged through the outlet adjacent to the cover glass 6 is blown on the surface of the cover glass 6 as an air shower 14 and air discharged through the air outlet remote from the cover glass 6 forms an air curtain 16 in front of the air shower 14. In order to isolate these air flows from the other space, covers 20 and 22 are provided. A fan 23 for blowing air is disposed in an upper portion of the air duct 18 and a filter 24 is provided at the upper end of the air duct 18 in order to prevent dust or the like from entering the air duct 18, whereby the air flows include clean air.

Figure 4:
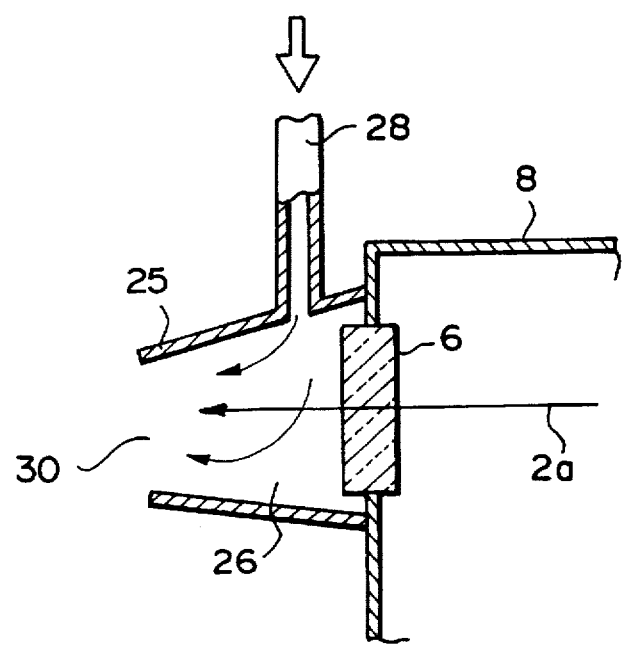
FIG. 4 is a cross-sectional view of a dust adhesion prevention system in accordance with still another embodiment of the present invention.

In a dust adhesion prevention system in accordance with another embodiment of the present invention shown in FIG. 4, a cover 25 which encloses a space 26 in front of the cover glass 6 and has an opening 30 at the front end thereof is provided to surround the laser beam 2a and to permit the laser beam 2a to pass therethrough. An air duct 28 for introducing pressurized air into the space 26 is connected to the cover 25 at a portion near the cover glass 6. The pressurized air introduced into the space 26 from the air duct 28 flows near the cover glass 6 and flows out through the opening 30, thereby preventing dust from adhering to the cover glass 6.

Figure 5:
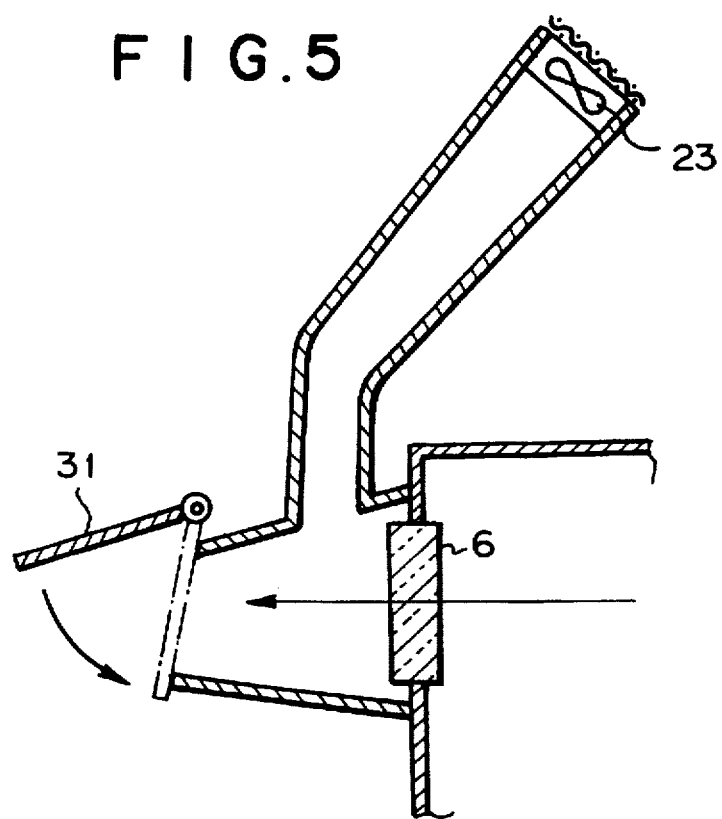
FIG. 5 is a cross-sectional view of a dust adhesion prevention system in accordance with still another embodiment of the present invention.

The opening 30 may be provided with a shutter 31 which closes the opening 30 as shown in FIG. 5 when introduction of the pressurized air into the space 26 is interrupted. The shutter 31 prevents dust from adhering to the cover glass 6 when the fan 23 is stopped.

In the above embodiments, it is preferred that the air flow includes air supplied from inside the image scanning system. In this case, since the temperature of the air flow is equal to that in the system, the optical path of the optical system can be free from flicker due to fluctuation in refractive index.

Figure 6:
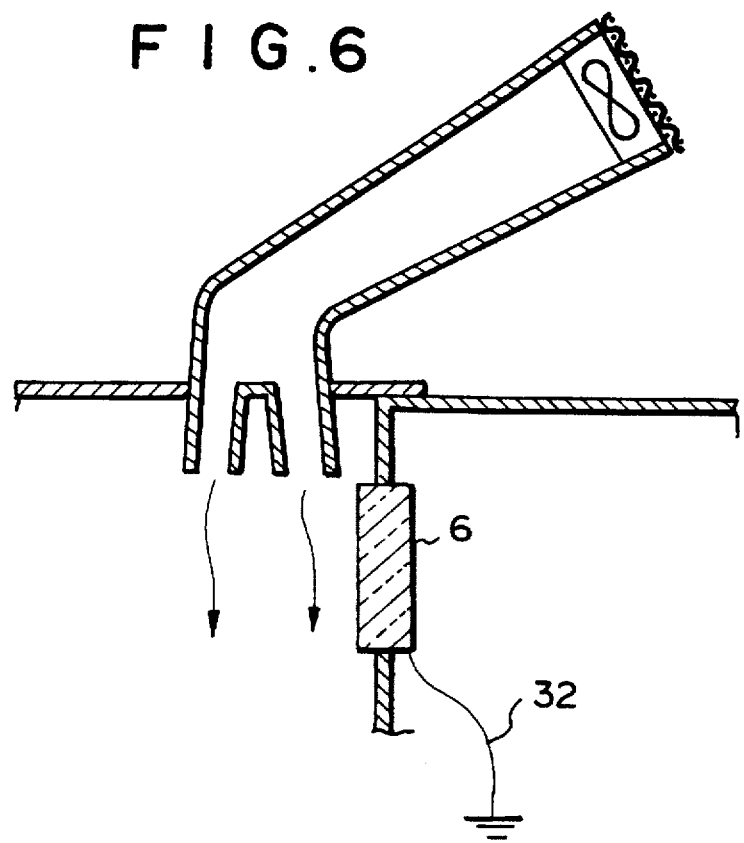
FIG. 6 is a cross-sectional view of a dust adhesion prevention system in accordance with still another embodiment of the present invention.

The still another embodiment shown in FIG. 6 is similar to that shown in FIG. 3 but differs from that in that the cover glass 6 is of a conductive material and is grounded through a ground lead 32 to prevent the cover glass 6 from being charged, thereby preventing charged dust from adhering to the cover glass 6.

The cover glass 6 may be charged to the same polarity as surrounding dust by use of, for instance, a corona discharger (not shown) so that charged dust becomes hard to adhere to the cover glass 6.

Grounding the cover glass 6 or charging the cover glass 6 to the same polarity as surrounding dust may be combined with any one of the arrangements shown in FIGS. 2 to 5 and may be used alone if desired.

Though the dust adhesion prevention system of the present invention can be applied to various image scanning systems for image recording such as a laser printer, it is especially suitable for image recording systems for a high quality image. As an example of such an image recording system, a digital photograph printer system in which a color image is recorded on a photographic paper on the basis of an image signal read from a color film will be described with reference to FIG. 7.

Figure 7:
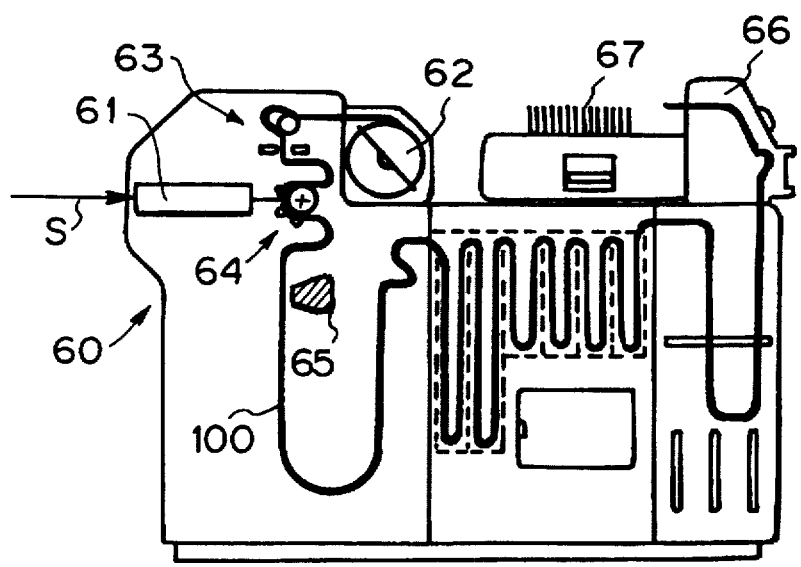
FIG. 7 is a schematic cross-sectional view of a digital photograph printing system which is an example of a system to which an image scanning system with the dust adhesion prevention system of the present invention can be applied.

In FIG. 7, an image signal S read from a photographic film and processed as required is input into a printer 60 for reproducing a visible image. The printer 60 includes a printing section, a developing section and a drying section. The printing section includes a hole punch unit 63 which punches a reference hole for positioning photographic paper 100 in the photographic paper 100 in a continuous length disposed in a photographic paper roll magazine 62, a sub-scanning system 64 which conveys the photographic paper 100 in the longitudinal direction thereof (sub-scanning direction) taking the reference hole as a reference, an exposure scanner 61 which causes a light beam modulated by a signal modulated by a modulator driver to scan the photographic paper 100 in a main scanning direction and a back recording unit 65 which records on the back side of the photographic paper 100 image retrieval information input through a printer control interface.

The drying section comprises a cutter 66 which cuts each print from the photographic paper 100 in a continuous length which has been exposed and dried and a sorter 67 which arranges the prints.

The modulator driver (not shown) modulates the light beam emitted from the exposure scanner 61 according to image data input.

The printer 60 is controlled by a CPU by way of a printer control interface. The sub-scanning system 64 conveys in the sub-scanning direction the photographic paper 100 in continuous length extending along a predetermined path from the magazine 62. The hole punch unit 63 is disposed on the path of the photographic paper 100 and punches the reference holes, which is used as a reference for synchronization, on the side edge portion of the photographic paper 100 at intervals corresponding to, for instance, one print length. In the printer 60, the photographic paper 100 is conveyed using the reference holes as a reference of synchronization.

While conveyed in the sub-scanning direction in this manner, the photographic paper 100 is scanned in the main scanning direction with a modulated light beam from the exposure scanner 61. Thus the photographic paper 100 is two-dimensionally scanned with the modulated light beam and is exposed to light imagewise. The sub-scanning speed is controlled by the CPU to a value suitable for reproduction of the image in synchronization with the main scanning speed.

The exposed photographic paper 100 is conveyed to the back recording unit 65. The back recording unit 65 receives image retrieval information unique to each piece of the image data from the CPU and records the image retrieval information, e.g., film number and exposure number, corresponding to each frame on the back side of the frame. The difference in position of the exposure scanner 61 and the back recording unit 65 is absorbed by a soft sequence (e.g., a sequence disclosed in Japanese Unexamined Patent Publication No. 5(1993)-193609) using the reference holes punched in the photographic paper 100. The image retrieval information may be recorded on a part of the front side of the photographic paper 100, i.e., the surface to be exposed to light. In this case, it is preferred that the information be recorded outside the exposed region, e.g., on the edge portion.

The exposed photographic paper 100 is conveyed from the printing section to the developing section, and then, after predetermined development and washing in the developing section, is conveyed to the drying section. In the drying section, the photographic paper 100 is dried and cut into prints by the cutter 66 on the basis of the reference holes. The prints for one film roll are stacked by the sorter 67 and returned to the customer together with the film which has been cut into film strips, each for six exposures.

In such a color printer, not only the sharpness of the image but also finish of color is important, and accordingly adhesion of dust to the cover glass which can result in streaking and nonuniformity in color should be avoided to the utmost. Thus, use of the dust adhesion prevention system of the present invention together with the cover glass is especially desirable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dust adhesion prevention system for an image scanning system having a deflector contained in a casing, comprising:

a cover glass transmitting a scanning light beam; and means for forming an air flow in front of the cover glass; wherein said means for forming an air flow in front of the cover glass includes a bifurcated air outlet which forms an air curtain in front of the cover glass and an air flow blown on the surface of the cover glass.

2. The dust adhesion prevention system of claim 1, wherein the air flow is an air flow blown on the surface of the cover glass.

3. The dust adhesion prevention system of claim 1, wherein the air flow is an air curtain formed in front of the cover glass.

4. The dust adhesion prevention system of claim 1, wherein an enclosed space is formed in a vicinity of the surface of the cover glass with an air outlet provided in a position remote from the surface of the cover glass and said means for forming an air flow forms the air flow by pressurizing the space so that air is discharged through the air outlet.

5. The dust adhesion prevention system of claim 4, wherein the air outlet is provided with a shutter which closes the air outlet when the air flow is not formed.

6. The dust adhesion prevention system of claim 4, wherein the cover glass is conductive and grounded.

7. The dust adhesion prevention system of claim 1, further comprising means for charging the cover glass with the same polarity as dust.

8. A dust adhesion prevention system for an image scanning system having a deflector contained in a casing, comprising:

a cover glass transmitting a scanning light beam;

means for grounding the cover glass, the cover glass being conductive; and said means for forming an air flow in front of the cover glass includes a bifurcated air outlet which forms an air curtain in front of the cover glass and an air flow blown on the surface of the cover glass.

* * * * *